US010097072B2

(12) United States Patent
Xu et al.

(10) Patent No.: US 10,097,072 B2
(45) Date of Patent: Oct. 9, 2018

(54) LINEAR VIBRATOR

(71) Applicants: Hongfu Xu, Shenzhen (CN); Zhilin Chai, Shenzhen (CN); Na Wu, Shenzhen (CN)

(72) Inventors: Hongfu Xu, Shenzhen (CN); Zhilin Chai, Shenzhen (CN); Na Wu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 564 days.

(21) Appl. No.: 14/742,786

(22) Filed: Jun. 18, 2015

(65) Prior Publication Data

US 2016/0181902 A1    Jun. 23, 2016

(30) Foreign Application Priority Data

Dec. 23, 2014    (CN) .................... 2014 2 0827655 U

(51) Int. Cl.
*H02K 33/12*    (2006.01)
*H02K 33/16*    (2006.01)
*H02K 33/18*    (2006.01)

(52) U.S. Cl.
CPC ............. *H02K 33/12* (2013.01); *H02K 33/16* (2013.01); *H02K 33/18* (2013.01)

(58) Field of Classification Search
CPC ......... H02K 33/16; H02K 33/12; H02K 33/18
See application file for complete search history.

(56) References Cited

U.S. PATENT DOCUMENTS

| 8,456,042 B2* | 6/2013 | Dong | H02K 33/16 310/15 |
| 9,614,425 B2* | 4/2017 | Jin | H02K 33/12 |
| 2009/0267423 A1* | 10/2009 | Kajiwara | H02K 33/16 310/36 |
| 2010/0213773 A1* | 8/2010 | Dong | H02K 33/16 310/25 |
| 2011/0115311 A1* | 5/2011 | Dong | H02K 33/16 310/28 |
| 2011/0156500 A1* | 6/2011 | Dong | H02K 33/16 310/25 |
| 2016/0181902 A1* | 6/2016 | Xu | H02K 33/16 310/17 |

* cited by examiner

*Primary Examiner* — Mohamad Musleh
(74) *Attorney, Agent, or Firm* — Na Xu; IPro, PLLC

(57) ABSTRACT

A linear vibrator includes a stator having a housing including a receiving space; a moveable unit received in the receiving space; an elastic member having one end connecting to the moveable unit and another end connecting to the stator for suspending the moveable unit in the receiving space; and a cushion arranged between the moveable unit and the housing, the cushion comprising a plurality of parts having different stiffness.

8 Claims, 4 Drawing Sheets

LINEAR VIBRATOR

FIELD OF THE INVENTION

The present invention relates to vibrators for generating tactile vibrations, more particularly to a linear vibrator used in a portable consumer electronic device.

DESCRIPTION OF RELATED ART

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibrator. Linear vibrators are widely used in consumer products and are disclosed in U.S. Pat. No. 6,466,682 B2 issued on Oct. 15, 2002, and U.S. Pat. No. 7,099,489 B2 issued on Aug. 29, 2006. The vibrator is mounted on a mounting surface of a printed circuit board, and the moving unit thereof is actuated to move along a direction perpendicular to the mounting surface. Another linear vibrator includes a moveable unit suspended by a plurality of elastic members for being movable along a direction parallel to a mounting surface of a printed circuit board from which vibration signals are transmitted.

While working, the vibrator needs to be provided with sufficient driving force to drive the movable unit to generate strong vibrations. Exceeding driving force would drive the moveable unit to strike the housing of the vibrator thereby causing noises.

Accordingly, an improved linear vibrator capable of avoiding striking noises and shortening return time is desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment.

Figure 1:
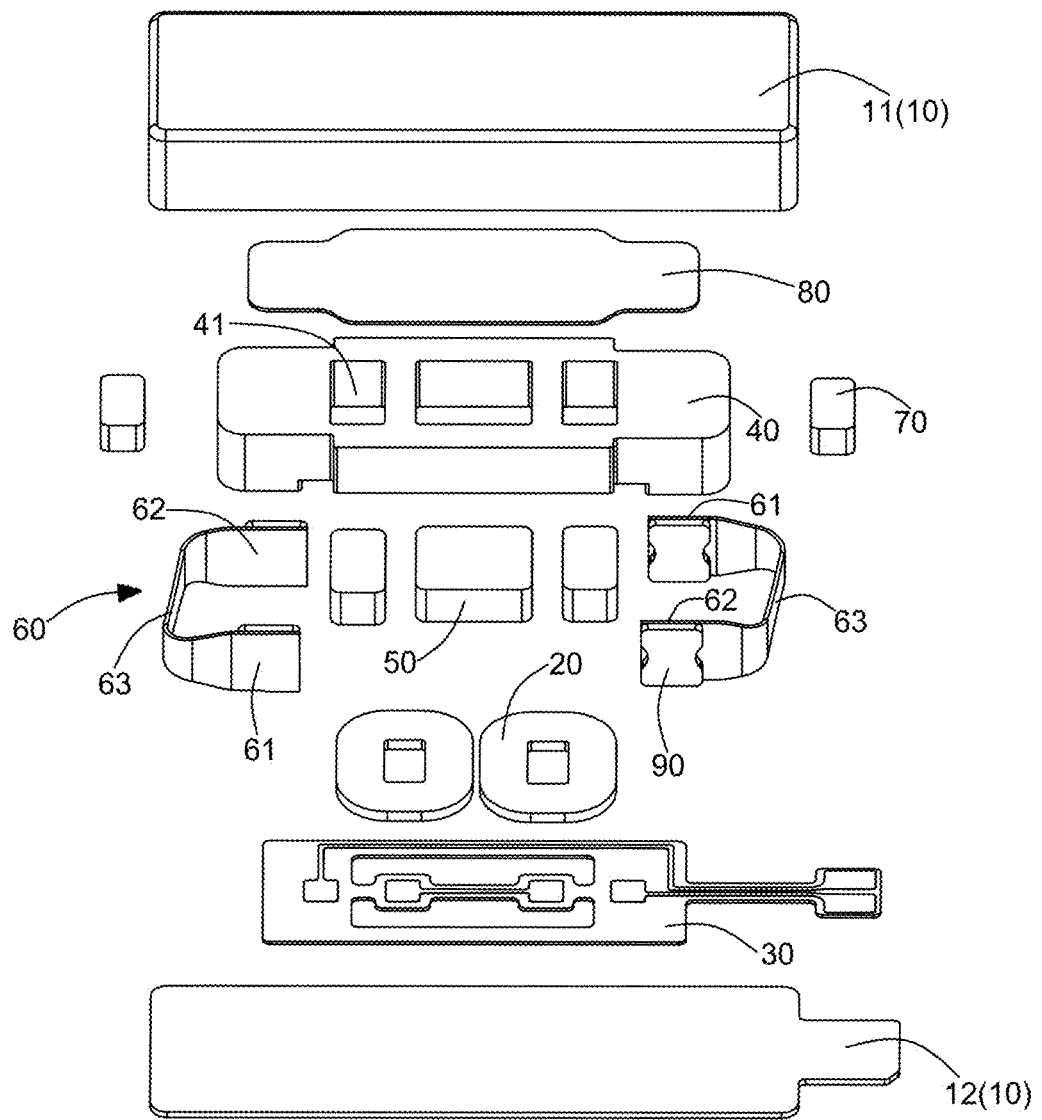
FIG. 1 is an isometric and exploded view of a linear vibrator in accordance with an exemplary embodiment of the present disclosure.
Figure 2:
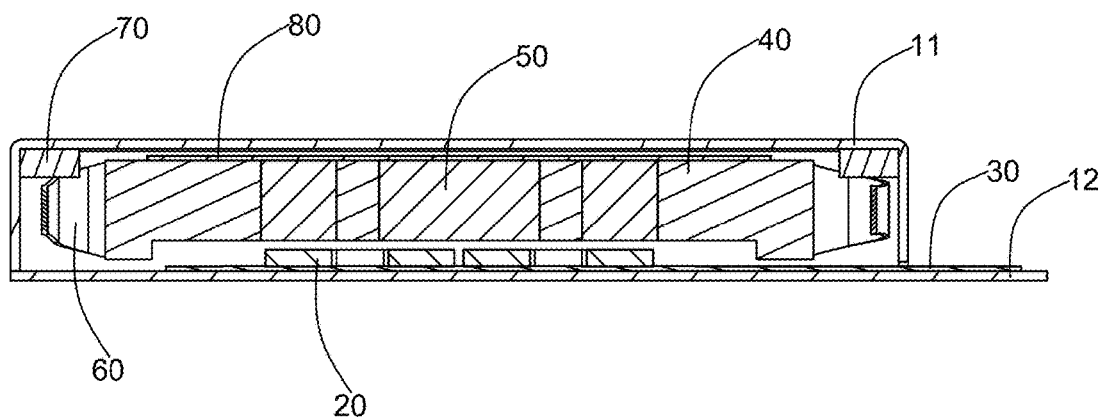
FIG. 2 is a cross-sectional view of the linear vibrator in FIG. 1.

Referring to FIGS. 1-2, a linear vibrator 100 in accordance with an exemplary embodiment of the present disclosure includes a housing 10 providing an accommodating space therein, and a coil 20 received in the accommodating space. The housing 10 comprises a cover 11 and a base 12 engaging with the cover 11. The coil 20 is positioned on the base 12. The vibrator 100 further includes a circuit board 30 attached to the base 12 for providing the coil 20 with driving signals. Here, the housing 10, the coil 20, and the circuit board 30 cooperatively form a stator of the vibrator. Be noted that the stator may include other components as long as the components are relatively fixed.

The linear vibrator 100 further includes a weight 40 having a receiving hole 41, a magnet assembly 50 received in the receiving hole 41, a pole plate 80 attached to the weight 40, and a plurality of elastic members 60 suspending the weight 40 in the accommodating space of the housing 10. The magnet assembly 50 is disposed above the coil 20 and keeps a distance from the coil 20. The magnet assembly 50 may comprise one or more magnets. Here, the weight 40, the magnet assembly 50, and the pole plate 80 cooperatively form a moveable unit (rotor) of the linear vibrator 100. In fact, the moveable unit may comprise other components as long as the other components are moveable with respect to the stator. Alternatively, the coil 20 could be mounted in the receiving hole of the weight, and the magnet assembly could be mounted on the base 12.

Figure 5:
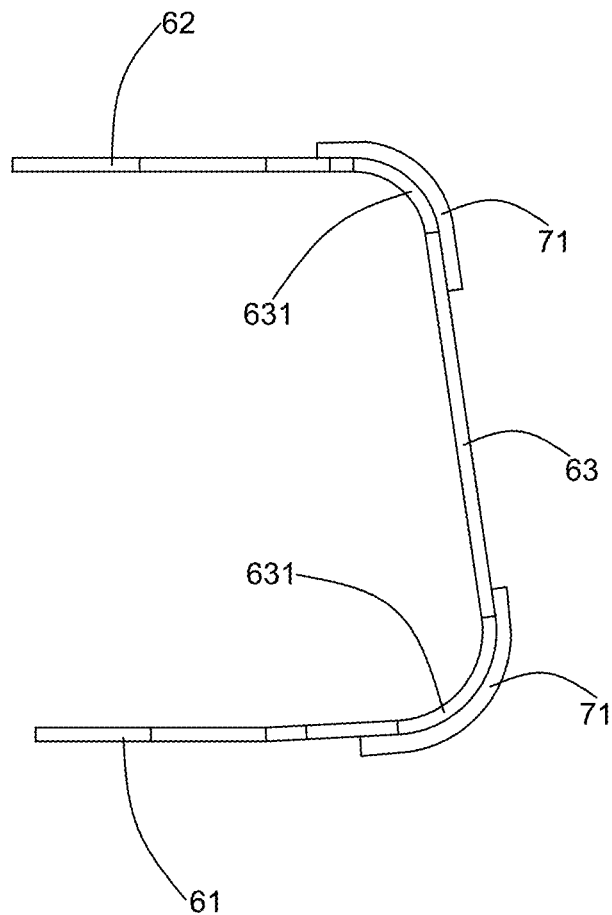
FIG. 5 is an illustration of en elastic member of the linear vibrator.

Referring to FIG. 5, the elastic member 60 includes a first elastic arm 61 connecting to the cover 11, a second elastic arm 62 connecting to the moveable unit, and a third elastic arm 63 connecting the first elastic arm to the second elastic arm 62.

Figure 3:
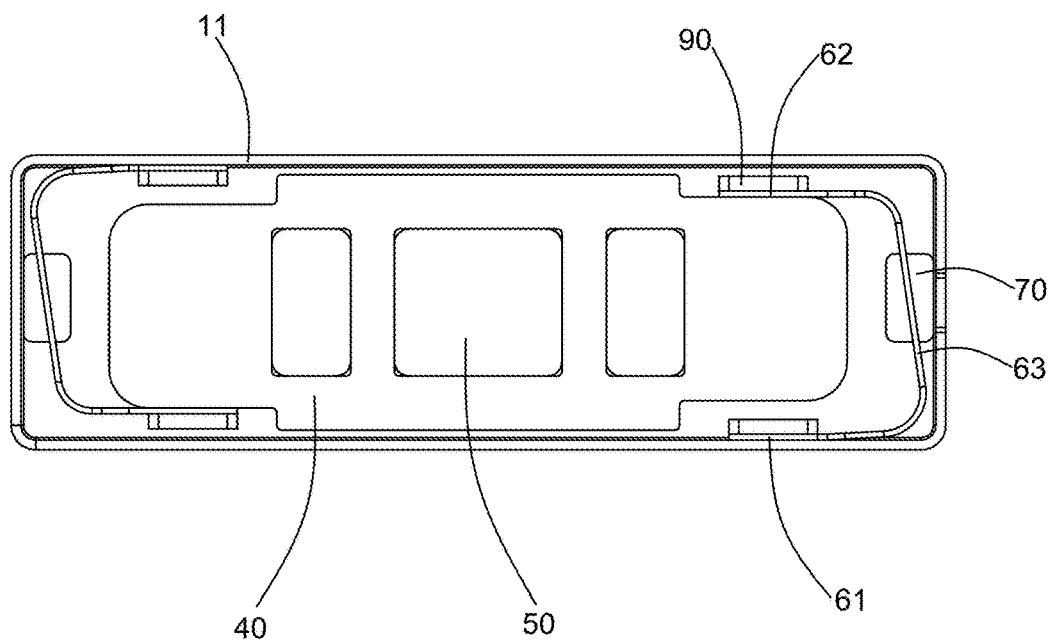
FIG. 3 is a top view of the linear vibrator, wherein a top of a housing thereof is removed.

Referring to FIG. 2-3, the linear vibrator 100 further includes a cushion 70 that is arranged between the moveable unit and the housing 10 for avoiding the moveable unit or the elastic member 60 from contacting the housing 10 directly during the vibration of the moveable unit. As mentioned above, the moveable unit in this embodiment is formed by the weight 40, the magnet 50 and the pole plate 80. In addition, the cushion 70 is disposed in the vibration path of the moveable unit and positioned by the housing 10. Alternatively, the cushion 70 may be disposed in the vibration path of the moveable unit and positioned by the moveable unit. Alternatively again, the cushion 70 may also be positioned on the elastic member 60 and is in the vibration path of the moveable unit. As shown in FIG. 3, the cushion 70 is positioned by the third elastic arm 63, and is located between the third elastic arm 63 and the cover 11. Moreover, the cushion 70 may also be arranged between the moveable unit and the base 12 for preventing the moveable unit from striking the base 12.

Figure 4A:
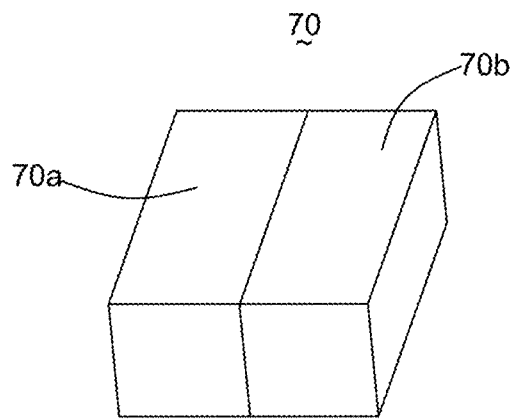
FIGS. 4a-4d are illustrations of variable forms of a cushion of the linear vibrator.
Figure 4B:
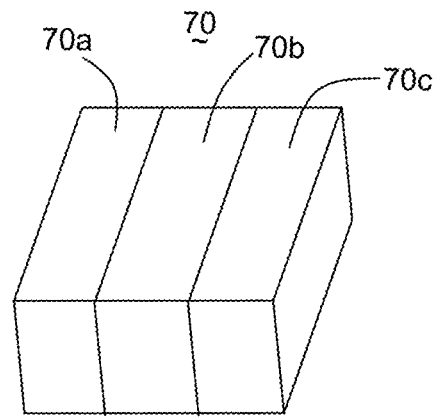
Figures 4C, 4D:
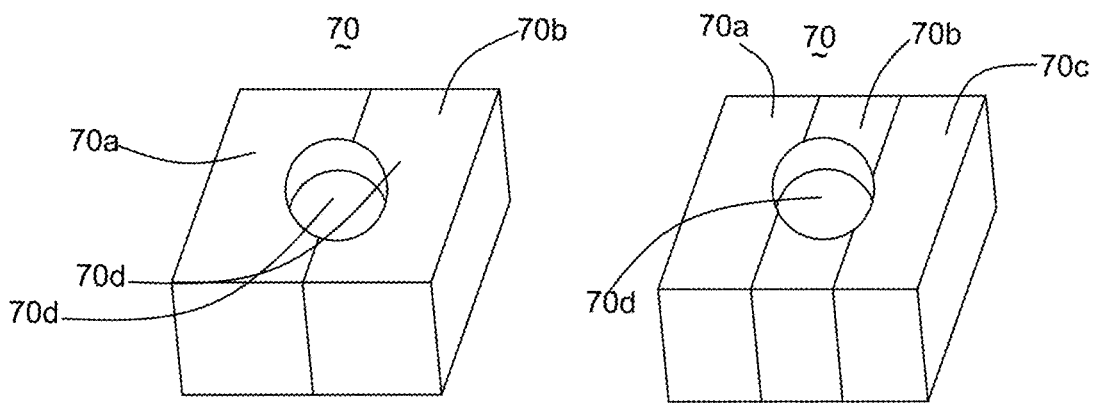

Referring to FIGS. 4a-4d, the cushion 70 may have variable forms. For example, as shown in FIG. 4a, the cushion 70 is formed by a first part 70a, and a second part 70b having a stiffness different from the first part 70a. As shown in FIG. 4b, the cushion 70 is formed by a first part 70a, a second part 70b, and a third part 70c. At least two of the three parts have different stiffness. As shown in FIG. 4c, a through hole 70d is formed based on the configuration shown in FIG. 4a, and as shown in FIG. 4d, a through hole 70d is formed based on the configuration shown in FIG. 4b. The through hole 70d is used for adjusting the damping force of the cushion. Of course the cushion could be formed by a plurality of parts having different stiffness, i.e. the cushion is formed by relatively softer parts and relatively harder parts. And the stiffness of the parts could be increased gradually, or decreased gradually. In fact, according to actual requirements, the stiffness of the parts could be variable increased and then decreased, or variable randomly.

The material of the cushion 70 can be selected from but not limited to sponge, silicone, foam, fiber. It is optional that the softer part of the cushion is connected to the moveable unit, the elastic member, or the housing.

The cushion of the present disclosure provides better damping performance. When the moveable unit vibrates beyond predetermined amplitude, the cushion can prevent the moveable unit from striking the housing, and further avoid noises.

Referring back to FIG. 1, the linear vibrator 100 further includes a gasket 90 attached to the first elastic arm 61 or to the second elastic arm 62 for enhancing the connection stability between the elastic member and the moveable unit.

Referring to FIG. 5, the third elastic arms 63 includes a pair of deforming parts 631 each being attached with a damping member 71. The damping member 71 is formed by adhesive layer, PU (Polyurethane), or silicone. The damping member 71 is used for decreasing the compliance for the elastic member 60.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibrator, comprising:
    a stator having a housing including a receiving space;
    a moveable unit received in the receiving space;
    an elastic member having one end connecting to the moveable unit and another end connecting to the stator for suspending the moveable unit in the receiving space;
    a cushion arranged between the moveable unit and the housing, the cushion comprising a plurality of parts having different stiffness,
    wherein the cushion includes a through hole therein, the through hole passes through at least two different stiffness parts.

2. The linear vibrator as described in claim 1, wherein the parts are arranged in an order that the stiffness thereof increase gradually.

3. The linear vibrator as described in claim 1, wherein the parts are arranged in an order that the stiffness thereof increase gradually and then decrease gradually.

4. The linear vibrator as described in claim 1, wherein the cushion is positioned by the housing, and a part thereof having a relatively lower stiffness faces the moveable unit.

5. The linear vibrator as described in claim 1, wherein the cushion is arranged on the moveable unit, and a part thereof having a relatively lower stiffness faces the housing.

6. The linear vibrator as described in claim 1, wherein the elastic member includes a first elastic arm connecting to the moveable unit, a second elastic arm connecting to the stator, and a third elastic arm connecting the first elastic arm to the second elastic arm.

7. The linear vibrator as described in claim 6 further comprising a gasket disposed on the first elastic arm or the second elastic arm.

8. The linear vibrator as described in claim 6, wherein the third elastic arm comprises a deforming part and a damping member attached to the deforming part.

* * * * *